May 28, 1935.  J. R. LONG  2,002,783

VALVE

Filed July 31, 1933

Inventor
Jon R. Long

By Jack A. Erley
Attorney

Patented May 28, 1935

2,002,783

UNITED STATES PATENT OFFICE 2,002,783

VALVE

Jon R. Long, Fort Worth, Tex.

Application July 31, 1933, Serial No. 682,963

2 Claims. (Cl. 251—127)

This invention relates to new and useful improvements in valves.

One object of the invention is to provide an improved drop for a drop and seat type of valve.

It is customary in fluid pumps used in oil wells and other places to employ two types of valves, one known as a ball and seat and the other known as a drop and seat. Each has its advantages and its objections. A ball is likely to score in seating because of its whirling due to the lack of a guide. Also a ball is likely to batter in engaging the crown of its cage. A drop is usually constructed with a flat bottom or underside. When a drop settles upon its seat its flat underside sets up a turbulence thereunder which is very objectionable in the pumping of oil and other fluids.

A particular object of the invention is to provide an improved drop which will combine the advantages of a ball and drop and eliminate the disadvantages thereof.

An important object of the invention is to provide a drop with a ball or rounded end arranged so that the drop overhangs the ball, whereby the ball is protected, in its opening and closing movements, from contact with the side of the cage, thus prolonging the life of the drop and assuring a tight seat because danger of scoring or marring the ball is obviated.

An important object of the invention is to reduce turbulence to a minimum both when the drop is seated and when it is elevated above its seat and liquid is flowing around it.

A construction designed to carry out the invention will be hereinafter described, together with other features of the invention.

Figure 1:
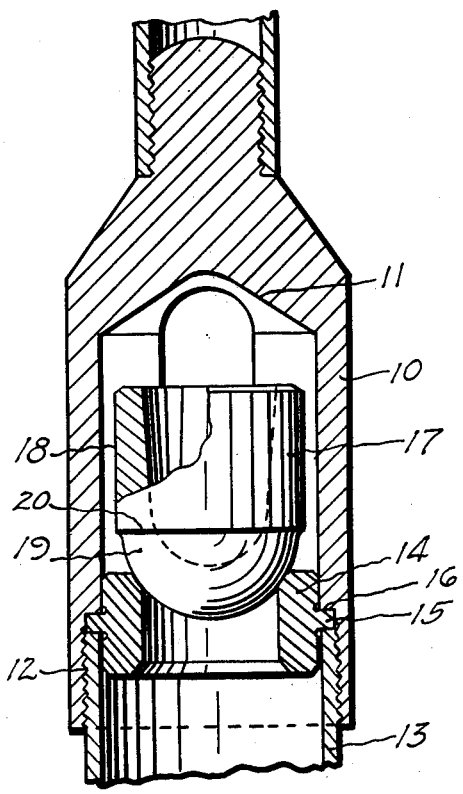
Figure 3:
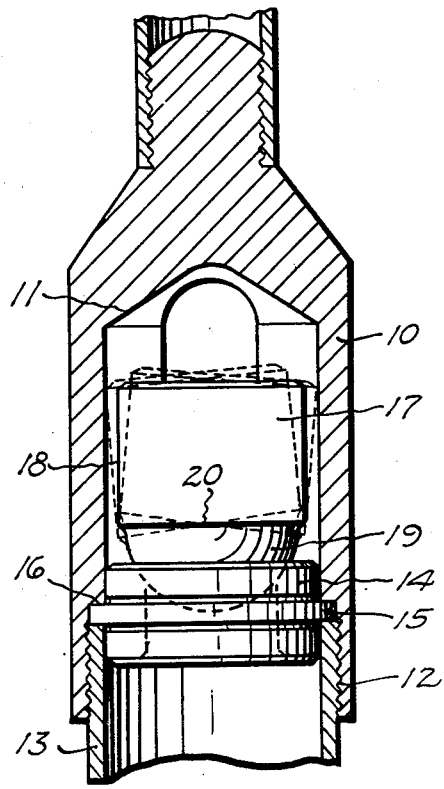
Figure 2:
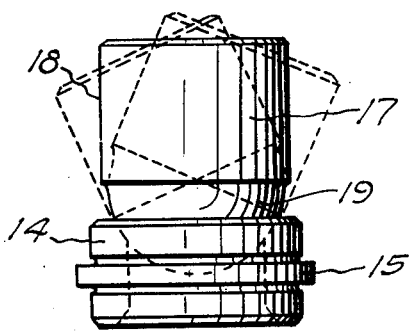

The invention will be more readily understood from a reading of the following specification and by reference to the accompanying drawing in which an example of the invention is shown, and wherein:

Figure 1 is a view of a valve, partly in section and partly in elevation, and having a drop constructed in accordance with the invention, Figure 2 is an elevation of a drop and seat, and Figure 3 is a view similar to Figure 1, showing the drop and seat in elevation and indicating various positions of the drop in dotted lines.

In the drawing the numeral 10 designates a valve cage having the usual crown 11. The lower end of the cage is internally screw-threaded at 12. The upper end of a barrel or sleeve 13 is screwed into the threads 12. A reversible seat 14 of the usual construction has its supporting flange 15 clamped between the upper end of the barrel 13 and the shoulder 16 of the cage. The parts which have been described are of the usual construction now in common use. It is to be understood that these parts are subject to variation and any, suitable for the purpose, may be used.

The essential feature of the invention is a drop 17 which has a cylindrical guide 18 of the usual construction. The guide is considerably less in diameter than the interior of the cage 10 so as to permit the drop to move freely vertically as well as laterally.

A semi-spherical or ball end 19 is formed on the bottom of the drop and its radius is less than that of the guide 18, whereby an annular shoulder 20 is formed between the ball and the guide. This shoulder causes the guide to overhang the ball.

By observing Figure 3, it will be seen that the ball 19 may freely rock on its seat and also will properly engage its seat when the drop is tilted at various angles to the perpendicular. The overhanging shoulder 20 will limit the rocking of the drop as will be evident from observing the dotted lines in Figure 2, if the cage is so large that the guide will not accomplish this limitation. Further, the shoulder prevents battering of the ball against the sides of the cage, as well as causing the wear to take place on the guide and not on the ball.

The combination of the cylindrical guide and ball end gives a drop which will function in a more efficient manner. By reason of the ball, turbulence is substantially eliminated under the drop and instead the fluid is caused to streamline through the valve seat and up through the cage. The shoulder 20 causing the lower edge of the guide to overhang the ball, provides a drip for the outer surface of the guide. Thus foreign matter running down the guide will fall off instead of running down the ball and forming a coating thereon.

The description which has been given, recites more or less detail of a particular embodiment of the invention, which is set forth as new and useful, however, I desire it understood that the invention is not limited to such exact details of construction because it is manifest that changes and modifications may be made, within the scope of the appended claims, without departing from the spirit of the invention.

What I claim and desire to secure by Letters Patent, is:

1. In a fluid pump valve including a cylindrical valve cage and a valve seat having a spherical seat for a drop, a drop for said valve including a cylindrical guide portion of less diameter than the internal diameter of the valve cage so as to be guided by the cage but permit free vertical and lateral movement, and a semi-spherical ball end for cooperation with the valve seat having a diameter less than that of said cylindrical guide portion so that the cylindrical guide portion will provide a shoulder completely surrounding and overhanging the ball end whereby foreign matter running down the guide will fall off instead of running down the ball and forming a coating thereon and whereby the drop will permit a stream-line flow of fluid through the cage substantially without turbulence.

2. A valve drop for a fluid pump valve having a cylindrical valve cage and a valve seat with a spherical seating surface, said valve drop consisting of a cylindrical body portion having a diameter less than the internal diameter of the valve cage so that it will freely reciprocate within the valve cage with but a small lateral movement, said body portion having a semi-spherical ball end for cooperating with the spherical seating surface of the valve seat, and said body portion being of a larger diameter than the ball end providing an overhanging shoulder completely surrounding said ball end and positioned by the ball end at such a height above the valve seat that it will not engage the valve seat when mounted in the valve cage and will not interfere with the fluid flow through the valve.

JON R. LONG.